Dec. 29, 1970  J. PFANDL  3,550,222
LOCKING DEVICE
Filed Sept. 9, 1968
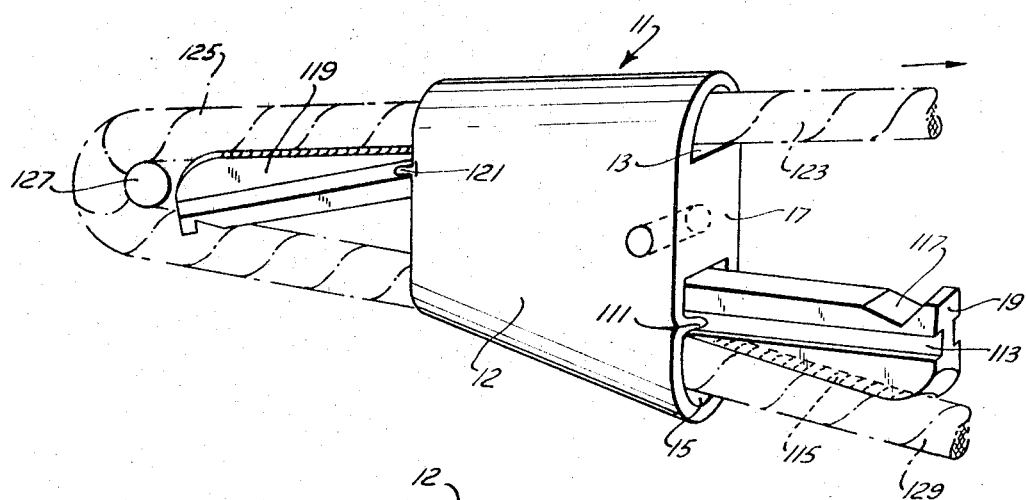
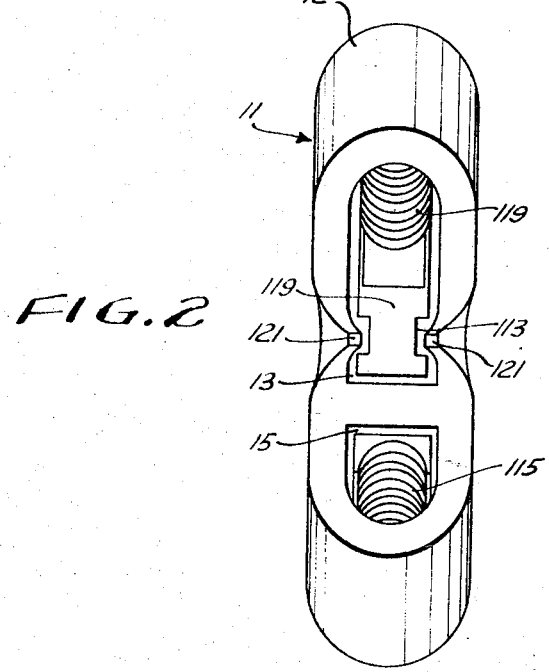
INVENTOR
JULIUS PFANDL
BY
Michael S Striker
ATTORNEY

United States Patent Office 3,550,222
Patented Dec. 29, 1970

3,550,222
LOCKING DEVICE
Julius Pfandl, Irdning, Austria, assignor to Afrocommerce S.A., Ennetbaden, Switzerland
Filed Sept. 9, 1968, Ser. No. 758,312
Claims priority, application Switzerland, May 28, 1968, 7,900/68
Int. Cl. F16g *11/04*
U.S. Cl. 24—126     7 Claims

ABSTRACT OF THE DISCLOSURE

A locking device for cables and the like includes a housing which is provided with two opposite ends and formed with two open-ended channels extending between these ends and having axes inclined towards one another in direction from one to the other of these ends. Inner circumferential walls bound these channels the latter of which have inner cross sections which converge in mutually opposite directions. A pair of wedge members are each slidably received in one of these channels with sufficient clearance to accommodate an elongated flexible element such as a cable wedged between the respective wedge member and the inner circumferential wall of the associated channel. Each wedge member is provided with a longitudinally extending groove and an exterior surface, and a projection on the housing extends into this groove and prevents the wedge member from being accidentally completely withdrawn from the associated channel.

BACKGROUND OF THE INVENTION

The present invention relates generally to a locking device, and more particularly to a locking device for use with such elongated elements as cables, ropes and analogous flexible elongated elements.

There are frequently applications where it is necessary to reliably lock a rope, a cable or analogous flexible elongated element against undesired movement under longitudinally directed forces. The present invention is directed towards a reliable locking device for such purposes, and has as one of its objects the provision of a novel locking device of this type.

An additional object of the invention is to provide such a locking device which is simple in its construction and therefore simple to manufacture, and which can be readily mass produced because it does not rely on the maintenance of manufacturing tolerances for its reliable operation.

A further object of the present invention is to provide a locking device of the type in question in which all individual components are so associated with one another that they cannot become accidentally separated and lost.

SUMMARY OF THE INVENTION

In accordance with the above objects, and others which will become apparent hereafter, one feature of my invention resides in the provision of a locking device, particularly a locking device for cables, ropes and analogous elongated flexible elements, which comprises a housing, two wedge members and cooperating male and female retaining portions provided on the housing and the wedge mmebers, respectively.

Advantageously the housing consists of aluminum, and it is still more preferred that the housing consist of press-cast aluminum. It has two opposite ends and is provided with two open-ended bores or channels both of which extend from one to the other of these ends. These bores have axes which are inclined towards one another in direction from one to the other of these ends and each channel is bounded by an inner circumferential wall defining an internal cross section which in one channel converges in the direction towards the one end of the housing and in the other channel in the direction towards the opposite end of the housing, so that the cross-sections converge in mutually opposite directions. The aforementioned pair of wedge members are each slidingly received in one of these channels and so configured as to leave sufficient clearance to accommodate an elongated flexible element wedged between the respective wedge member and the inner circumferential wall bounding the associated channel. Each wedge member is provided with at least one longitudinally extending groove in an outer surface, but this groove does not extend the entire length of the respective wedge member. The housing is provided with at least two projections each of which extends into one of these grooves so that the wedge members can slide in the respective channels but are prevented from accidental withdrawal therefrom by provision of the projections which abut the closed ends of the respective grooves in such a manner as to prevent withdrawal of the respective wedge members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a somewhat diagrammatic perspective view of a locking device according to my present invention, an elongated flexible element being shown in broken lines in conjunction with my locking device; and FIG. 2 is an end-elevational view of the locking device shown in FIG. 1, as seen in the direction looking from the left-hand side towards the right-hand side of FIG. 1.

DESCRIPTION OF THE PREFERRED EMBODIMENTS

Discussing now the drawing in detail it will be seen that my novel locking device is generally identified with reference numeral 11 and comprises a housing 12 which advantageously consists of aluminum, and still more preferably of pressure-cast aluminum. The housing 12 has opposite ends, as clearly visible in FIG. 1, and is provided with two open-ended passages 13 and 15 each of which extends from one to the other end of the housing 12. The passages 13 and 15 are separated by a center portion 17 of the housing and have respective axes which, as is clearly evident from FIG. 1, converge in the direction from one end toward the other end. In FIG. 1 the axes of the passages 13 and 15 converge in direction from the right-hand end towards the left-hand end of the housing 12. Furthermore, the inner cross-section of the respective passages 13 and 15 also converges in axial direction of the respective passage, but this convergence takes place in the two passages in mutually opposite directions. In other words, the inner cross-section of the passage 13 coverges in the direction from the left-hand end towards the right-hand end of the housing 12, and for the passage 15 this relationship is reversed.

A rope, cable or analogous elongated flexible element is to be inserted through the passages 13 and 15. In FIG. 1 such an element is identified with reference numeral 123 and shown in dot-dash lines. The free end of the element 123 is assumed to be that which is identified with reference numeral 129 and the arrow at the other illustrated end of the element 123 is assumed to indicate the direction in which a force can be expected to be exerted upon the element 123. Of course, it should be appreciated that the remainder of the element 123, located to the right of the uppermost illustrated end portion in FIG. 1, is not shown.

Each of the passages 13 and 15 receives a wedge-member, that which is received in the passage 15 being identified with reference numeral 19 and the one which is received in the passage 13 being identified with reference numeral 119. It is evident that the wedge members 19 and 119 are inserted into the passages 13 and 15 from mutually opposite directions, that is from the ends of the passages which respectively have the largest cross-sectional configuration. In view of the inclination of the axes of the passages 13 and 15, the directions in which the wedge members 19 and 119 may be slidingly inserted into and withdrawn from the passages 13 and 15 are also similarly inclined towards one another. In accordance with the present invention each of the wedge members 19 and 119 is provided with at least one relatively shallow groove 113 extending longitudinally of the respective wedge member from one towards but short of the other end. In other words, such grooves extend from the outermost ends of the respective wedge members (compare the wedge member 19 in FIG. 1) towards the innermost end but terminate short of the same. Of course, whereas mention has been made of only one such groove 113 provided in a lateral face of the respective wedge members, the drawing shows that an additional groove 113 may be provided in the respectively other lateral face paralleling the first one in each of the wedge members. Also, the grooves 113 could be of a cross-sectional configuration different from what is shown, and two or more grooves could be provided in one and the same lateral face of a single wedge member.

In any case, however, there are provided projections 111 and 121 which may be secured to the housing 12 or which may be integral therewith, that is of one piece therewith, as illustrated in the exemplary embodiment shown. These projections 111 and 121 each extend into one of the grooves 113. If they are of one piece with the housing 12, as in the illustrated embodiment, they will normally extend in axial direction of the respective passages 13 and 15, so as to allow for introduction of the wedge members 19 and 119 into the respectively associated passages, and once such introduction is accomplished the projections 111 and 121 will be bent inwardly until they project into the respective grooves 113. Now the wedge members can be withdrawn only to the extent of elongation of the grooves 113; once the respective wedge members have been withdrawn to this extent, the projections 111 and 121 will abut against the closed inner end of the respective groove 113 and will prevent further withdrawal. This reliably precludes accidental removal of the wedge members 19 and 119 from the housing 12, so that they can no longer be lost.

Each of the wedge members 119 and 19 has a first abutment face which abuts against the wall portion of the respective channel 13 and 15 facing the intermediate section 17 of the housing, and a second abutment face 115 which is advantageously roughened, as by being provided with transversely extending ridges or the like, so as to grip the surface of the element 123 more securely. It is clear that when the wedge members 19 and 119 are wedged into the respective passages 13 and 15 with the element 123 already present in these passages, a wedging force will be transmitted between the respective wall portions bounding the passages 13 and 15 and facing the intermediate section 17 on the one hand, and the abutment face 115 and the element 123 on the other hand. Thus, the element 123 is reliably wedged in the passages 13 and 15. To facilitate release of the wedge members they are each provided with a kerf or recess 117 in the region of their respectively outer ends. Also, they are rounded at their respectively outer ends, as illustrated, to preclude damage to the element 123 by sharp edges.

In the embodiment illustrated in FIGS. 1 and 2 the device is provided with a guide member 125 which embraces a rod 127 to thereby anchor the locking device. The element 123 is guided in this guide member 125 as shown.

It will be appreciated that exertion of a tensile stress upon the element 123 in the direction of the arrow shown in FIG. 1 stresses will be transmitted to both wedge members which will serve to draw the same deeper into their respective passages, so that the application of such tensile stress causes the element 123 to become even more securely and firmly wedged.

Of course, the provision of the grooves or recesses 113 does not appreciably affect the strength of the respective wedge members because these grooves or recesses are relatively shallow. A locking device according to my present invention is most simple and therefore ideally suited for mass production at low expense. Moreover, it is highly reliable in its operation and its wedge action can be initiated as well as terminated with the greatest of ease.

Of course it will also be appreciated that materials other than aluminum can be used for the device.

It will be understood that each of the elements described above, or two or more together, may also find a useful application in other types of constructions differing from the types described above.

While the invention has been illustrated and described as embodied in a locking device particularly for locking cables, ropes and analogous elongated flexible elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims:

1. A locking device, particularly for cables, ropes and analogous elongated flexible elements, comprising a one-piece housing having two opposite ends and being provided with a circumferentially complete outer wall portion and an inner wall portion, said wall portions defining between themselves two circumferentially closed interior open-ended channels both extending between said ends and having axes inclined towards one another in direction from one to the other of said ends, said channels having inner circumferential wall surfaces and respective inner cross-sections which converge in mutually opposite directions; a pair of wedge members each slidingly received in one of said channels with sufficient clearance to accommodate an elongated flexible element wedged between the respective wedge member and the inner circumferential wall surface of the associated channel; and cooperating male and female retaining portions unitary with said housing and said wedge members, respectively, for preventing separation of said wedge members from said housing.

2. A locking device as defined in claim 1, wherein said housing consists of cast aluminum.

3. A locking device as defined in claim 1, each of said inner circumferential wall surfaces of said channels comprising a first wall surface portion facing away from and a second wall surface portion facing inwardly towards the respectively other channel, and each of said wedge members having a first wedge surface contacting the respective second wall surface portion and a second wedge surface facing but spaced from the respective first wall surface portion and defining therewith the clearance for the elongated flexible element.

4. A locking device as defined in claim 3, said wedge members having spaced ends and each being provided with at least one third wedge surface extending between said spaced ends and from the respective first to the respective second wedge surface; and wherein said retaining portions comprise at least one elongated recess provided in each of said third wedge surfaces extending from one toward another spaced end of the respective wedge member, and projections provided on said housing and extending into the respective recesses.

5. A locking device as defined in claim 4, said projections being of one piece with said housing.

6. A locking device as defined in claim 4, wherein each of said wedge members is provided with an additional elongated recess similar to and paralleling the respective first-mentioned elongated recess, and wherein said retaining portions further comprise at least two additional projections provided on said housing and each extending into one of said additional elongated recesses.

7. A locking device as defined in claim 6, wherein each of said wedge members comprises an additional third wedge surface spaced from and located in a plane substantially parallel to the respective first-mentioned third wedge surface; and wherein said additional recesses are each provided in one of said additional third wedge surfaces.

References Cited

UNITED STATES PATENTS

| | | | |
|---|---|---|---|
| 2,212,670 | 8/1940 | Murray | 24—126 |
| 2,458,304 | 1/1949 | Runde | 24—126 |
| 3,350,750 | 11/1967 | Scarr et al. | 24—126 |

FOREIGN PATENTS

| | | | |
|---|---|---|---|
| 716,609 | 12/1941 | Germany | 24—126 |

J. KARL BELL, Primary Examiner